T. J. HUBBELL.
TRACE-HOOK.
No. 182,316. Patented Sept. 19, 1876.
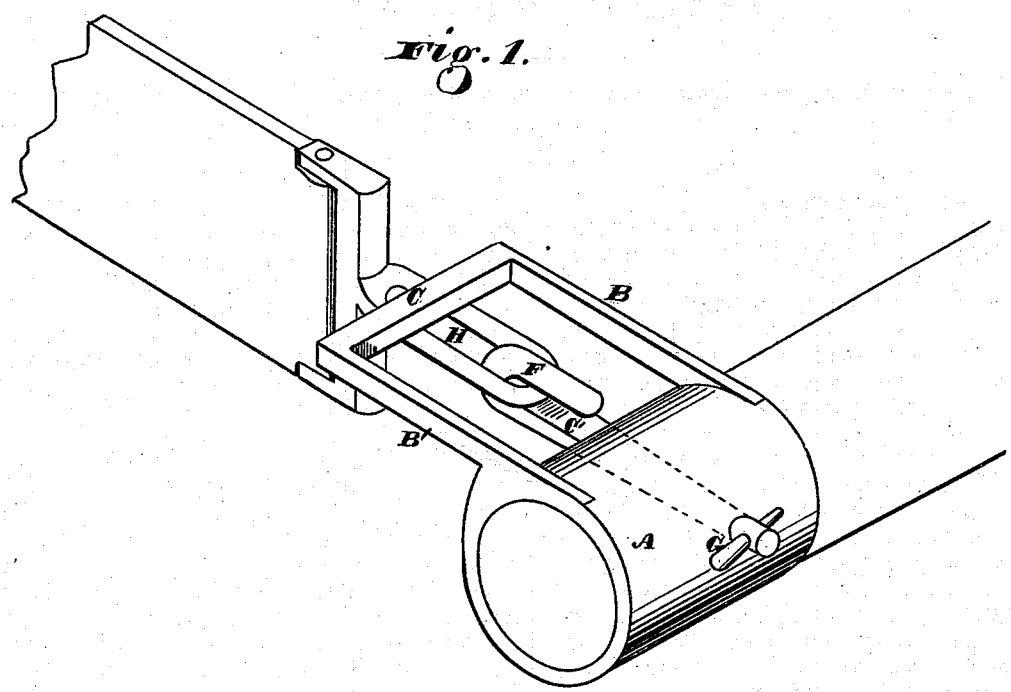

UNITED STATES PATENT OFFICE.

THOMAS JEFFERSON HUBBELL, OF NAPA CITY, CALIFORNIA.

IMPROVEMENT IN TRACE-HOOKS.

Specification forming part of Letters Patent No. 182,316, dated September 19, 1876; application filed August 3, 1876.

*To all whom it may concern:*

Be it known that I, THOMAS J. HUBBELL, of Napa City, in the county of Napa and State of California, have invented a Combined Ferrule and Trace-Fastener for Whiffletrees; and I do hereby declare the following to be a full, clear, and exact description thereof, reference being had to the accompanying drawing.

The object of my invention is to combine a trace-fastener of superior construction with the ferrule that fits over the ends of single-trees. The device can also be applied on the ends of neck-yokes, so as to provide a convenient fastening for the breast-strap.

Referring to the accompanying drawing, in which Figure 1 is a perspective view, let A represent the ferrule, which fits over each end of a single-tree or neck-yoke. This ferrule I construct with a square link projecting from its upper side, the two arms B B of which project tangentially from its opposite ends, while the cross-bar C unites the extremities of the arms.

This combined ferrule and link can be most conveniently and economically cast in one piece of cast malleable-iron, although it could be made of wrought-iron, if preferred.

I then secure the ferrule upon the end of the single-tree or neck-yoke, so that the link B C will project forward from its top, and stand horizontally when the strain of the draft is on the single-tree. Diametrically through the middle of the ferrule and end of the single-tree I make a horizontal hole, through which the shank c of a hook, F, can pass. The shank of the hook is introduced from the front side, and a nut can be screwed upon the end which projects on the rear side of the ferrule, or a key, G, can be used, as represented, so as to fasten the hook firmly to the ferrule and single-tree. The shank thus serves as a pin to keep the ferrule in place.

The hole in the front side of the ferrule should be made square, and the portion of the shank that fits in it should be made square, so that the hook cannot turn or become displaced when it is once secured.

The hook will be placed with its bend upward, and will be far enough inside of the cross-bar C to allow the trace link or loop H to pass up between its outer end and the cross-bar when the end of the link or tug is pushed upward between them. The loop of the link or tug is then thrown over the hook, and the trace or tug is fastened so that it cannot come loose without being properly manipulated, as the cross-bar C of the open link will prevent the tug from lifting so as to release the trace link or loop from the hook.

The same device can be used on the ends of neck-yokes, for providing a fastening for the breast-strap.

Having thus described my invention, what I claim, and desire to secure by Letters Patent, is—

1. The ferrule A, provided with the link B B C, and having the hook F passing through it and the wood below the link, substantially as and for the purpose described.

2. The ferrule A, with its link B B C secured upon the end of the single-tree by means of the shank c, upon the ends of which is a hook, F, the whole combined and arranged to operate as and for the purpose described.

THOMAS JEFFERSON HUBBELL.

Witnesses:
 J. L. BOONE,
 OLWYN T. STACY.